Nov. 30, 1971 T. E. HITZHUSEN 3,623,298
TOTAL CORN HARVESTER MACHINE
Filed Feb. 12, 1970 4 Sheets-Sheet 1

INVENTOR
THOMAS E. HITZHUSEN
BY
ATTORNEY

INVENTOR
THOMAS E. HITZHUSEN
BY
ATTORNEY

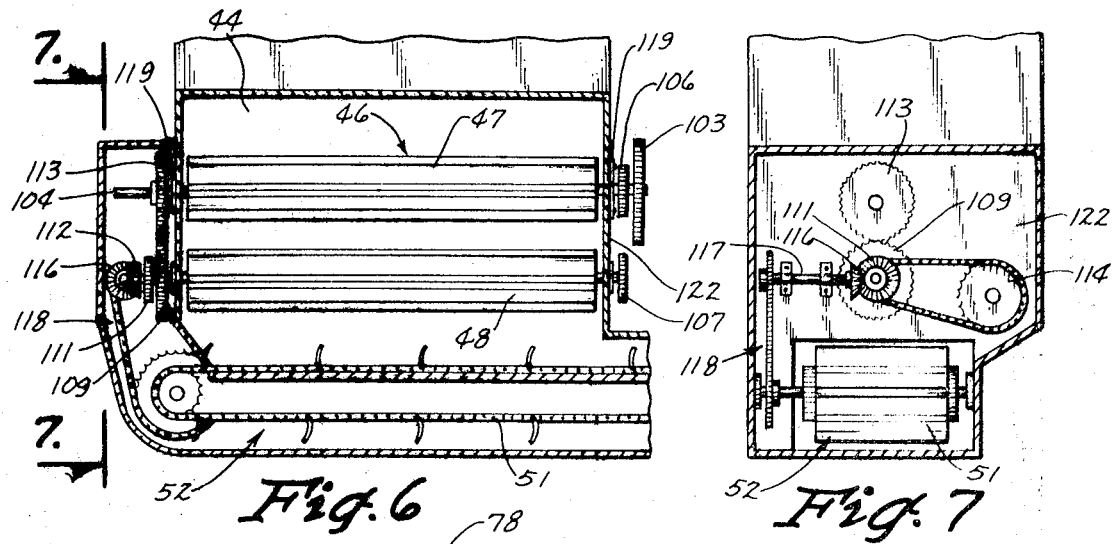
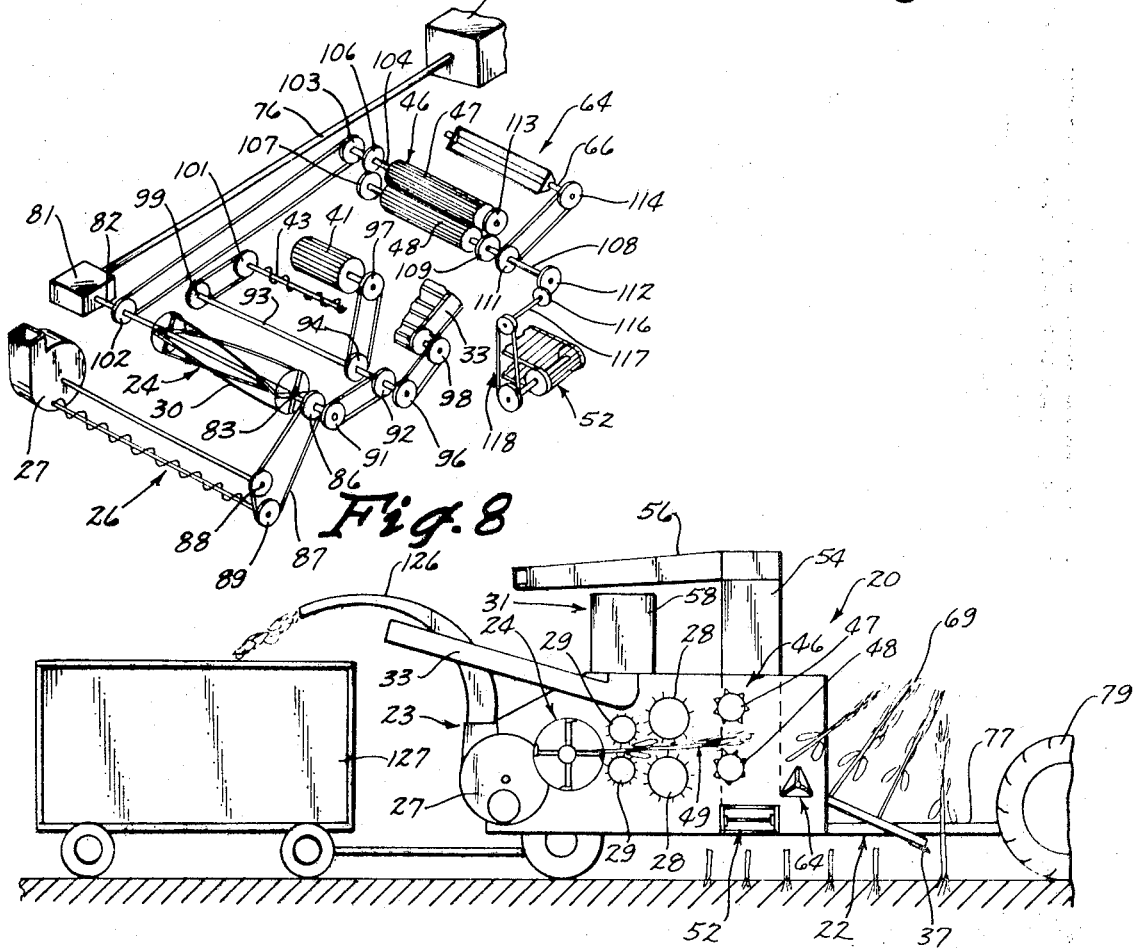

INVENTOR
THOMAS E. HITZHUSEN

ATTORNEY

United States Patent Office 3,623,298
Patented Nov. 30, 1971

3,623,298
TOTAL CORN HARVESTER MACHINE
Thomas E. Hitzhusen, Huxley, Iowa, assignor to Iowa
State University Research Foundation, Ames, Iowa
Filed Feb. 12, 1970, Ser. No. 10,939
Int. Cl. A01d
U.S. Cl. 56—2                                                      4 Claims

ABSTRACT OF THE DISCLOSURE

The machine operates to selectively harvest (1) the whole corn plant as ensilage (2) the whole corn ear separately from but concurrently with an ensilage comprised of the residual stalks and leaves or (3) shelled corn separately from but concurrently with an ensilage of refuse material comprised of the stalk, leaves and cobs. Cut corn plants from a front mounted row crop unit are directed butt first into a snapping unit and the picked ears conveyed for selective discharge into a wagon elevator or into a shelling unit. When the ears are harvested, the residual stalks and leaves from the snapping unit are fed into a chopping unit for delivery to a wagon discharge blower. When the picked ears are fed to the shelling unit the shelled corn is directed to the wagon elevator and the corn cobs are delivered to the chopping unit where they are chopped together with the residual stalks and leaves. By eliminating the action of the snapping unit on the corn plants, the whole corn plant including ears, stalk and leaves, is fed into the chopping unit for ensliage discharge.

SUMMARY OF THE INVENTION

The harvesting machine is of a compact and rugged construction and efficient and economical in operation to separately and concurrently harvest the total corn plant into the grain and residual components thereof. The plant refuse comprising stalks and leaves, or stalks and leaves plus cobs can be mixed with proper feed supplements to provide a satisfactory maintenance ration for beef cattle. One to two acres of corn stalks and leaves properly supplemented can maintain a cow and calf over the winter months. Corn stalk grazing, due to adverse weather conditions, is not dependable for this purpose. The total corn harvester machine of this invention processes the entire plant so that the grain is available to fatten a beef herd prior to sale and the refuse material to economically maintain the beef herd.

BRIEF DESCRIPTION OF THE DRAWINGS

FIG. 6 is a partial view illustrated similarly to FIG. 4 showing the snapping rolls in changed positions providing for the unobstructed travel therethrough of a corn plant;

FIG. 7 is a sectional view as seen on line 7—7 in FIG. 6;

FIG. 8 is a diagrammatic perspective view showing the power transmission system for the operating units of the harvester machine;

FIG. 9 is a diagrammatic illustration showing the operation of the machine providing for the harvesting of the whole corn plant in ensilage form;

DETAILED DESCRIPTION OF THE INVENTION

Figure 1:
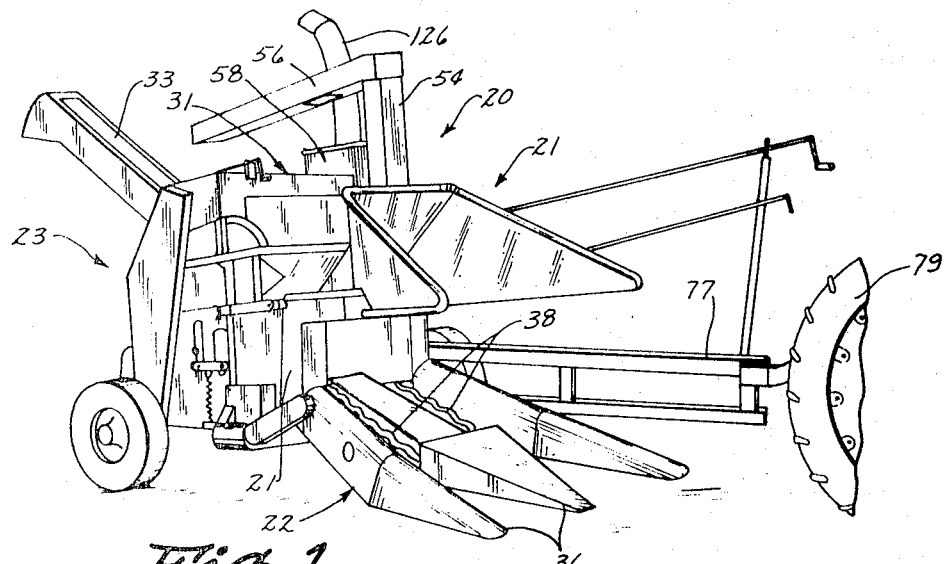
FIG. 1 is a front perspective view of the total harvester machine of this invention shown in a towed relation with a farm tractor.
Figure 2:
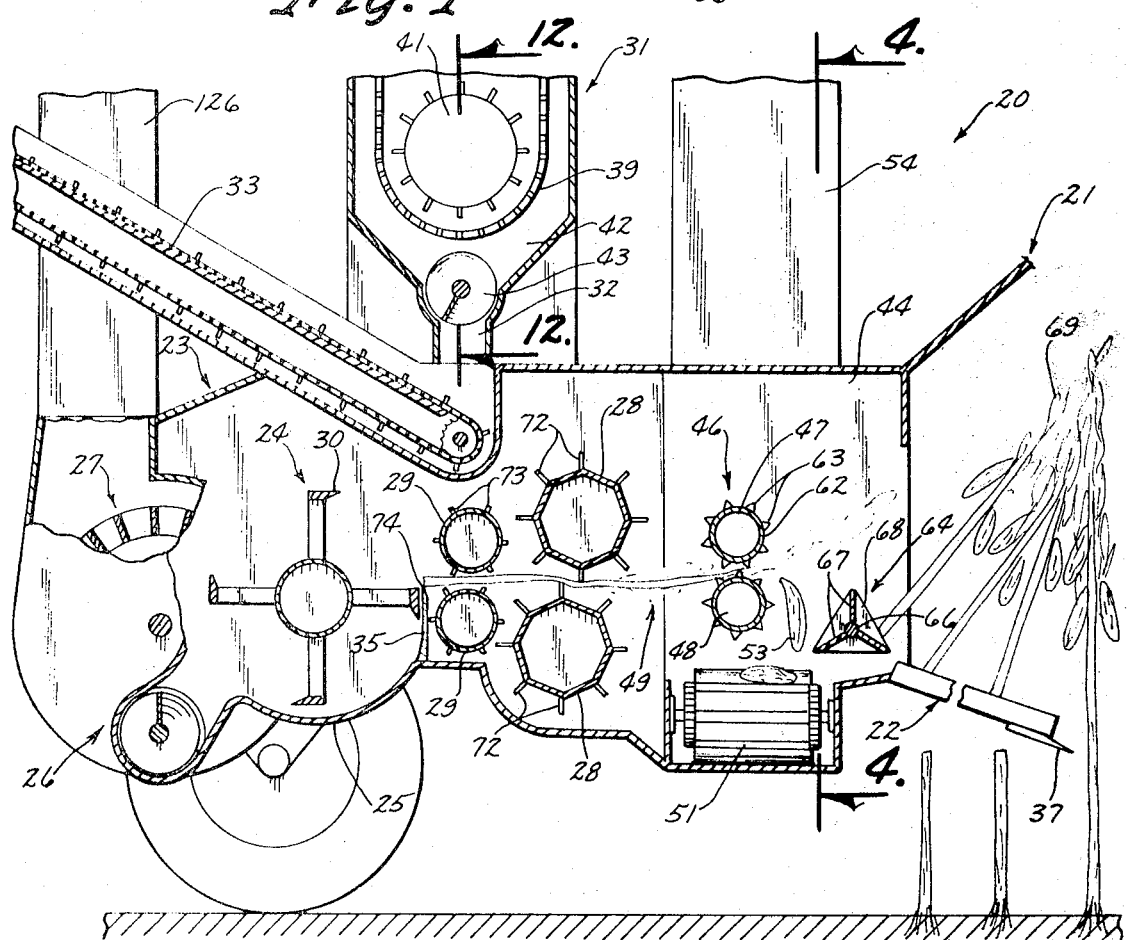
FIG. 2 is an enlarged foreshortened vertical longitudinal sectional view of the machine showing the relative arrangement of the operating units thereof.

The harvester machine of this invention is indicated generally at 20 and as shown in FIGS. 1 and 2 includes a front section 21 having a row crop unit 22 and a rear section 23 having a chopper unit 24, and a conveyor and discharge system wherein the chopped material from the chopper 24 is received by an auger conveyor 26 for delivery to a blower type wagon discharge unit 27. Arranged forwardly of the chopper unit 24 are two pairs of vertically disposed feed rolls 28 and 29, with the pair of feed rolls 28 being larger than the feed rolls 29 and located forwardly of the feed rolls 29. Mounted above the feed rolls 28 and 29 is a corn shelling unit 31 having a shelled corn outlet 32 open to a wagon elevator 33 and a cob outlet 34 (FIG. 12) open to the chopper unit 24.

The row crop head unit 22 is of the type available on the John Deere 38 Forage Harvester and functions to gather and cut corn plants and to carry the cut plants 69 into the machine. The row crop unit 22 (FIGS. 1 and 2) includes gathering snouts 36, a cutter bar 37 and gathering belts 38. The chopper unit 24 and its associated auger conveyor 26 and blower 27 are also of a type available on the John Deere 38 Forage Harvester. The chopper unit 24 has a lower semicircular shaped housing 25 and a reel type rotatable cutter 30 having knives extended spirally and longitudinally thereof for operative association with a stationary blade 35 mounted on the housing 25.

Figure 12:
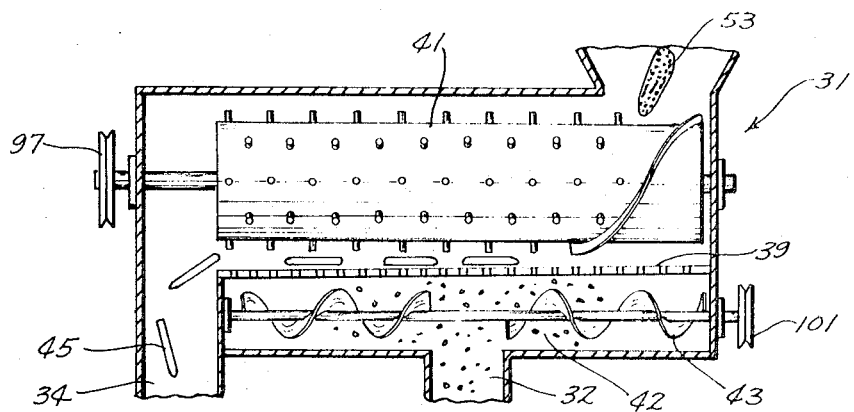
FIG. 12 is a sectional view of the corn shelling unit taken along the line 12—12 in FIG. 2.

The cage sheller 31 is of a type made by Avco New Idea Farm Division of Coldwater, Ohio, and includes a concave 39 (FIGS. 2 and 12) having an associated rotatable burr cylinder 41. Shelled corn removed by the rotatable burr cylinder 41. Shelled corn removed by the rotating cylinder 41 falls through perforations of the concave 39 and into a receiving trough 42 for removal by an auger 43 to the outlet 32 for delivery to the wagon elevator 33. The resultant cobs, indicated at 45 in FIG. 12, are moved by the cylinder 41 along the bottom of the concave 39 and into the cob outlet 34 for discharge into the chopper unit 24.

An intermediate section 44 (FIG. 2) of the harvester machine 20 includes a snapping unit 46 that has a pair of vertically disposed transversely extended snapping rolls 47 and 48. As shown in FIG. 2, the top side portions of the lower ones of the feed rolls 28 and 29 and the lower snapping roll 48 define a generally linear path of travel for corn stalks, indicated at 49, between the snapping rolls 47 and 48 and feed rolls 28 and 29 and into the chopper unit 24.

Located below the snapping rolls 47 and 48 (FIGS. 2 and 4) is a transversely extended section 51 of a continuous paddle type conveyor 52 for receiving corn ears, indicated at 53, snapped from the stalks 49 by the snapping unit 46. The ears 53 on the transverse conveyor section 51 are carried upwardly by an upright section 54 of the conveyor 52 for discharge into a chute 56 that is adjustable to direct the ears 53 into the corn sheller 31 or into the wagon elevator 33.

The free end of the chute 56 is arranged to discharge the ears 53 directly into the wagon elevator 33 and has an intermediate section in an overlying relation with the inlet 58 of the corn sheller 31 (FIGS. 1 and 9). This intermediate section of the chute 56 is provided with a butterfly valve 59 for opening and closing an oulet 61 in the bottom wall of the chute 56. The valve 59 in its open upright position constitutes a baffle for directing the ears 53 into the chute outlet 61 for dropping into the corn sheller inlet 31. In its closed position, the valve 59 forms a part of the bottom wall of the chute 56 to provide for a travel of the ears 53 over the full length of the chute 56 for discharge from its free end into the wagon elevator 33.

Figure 3:
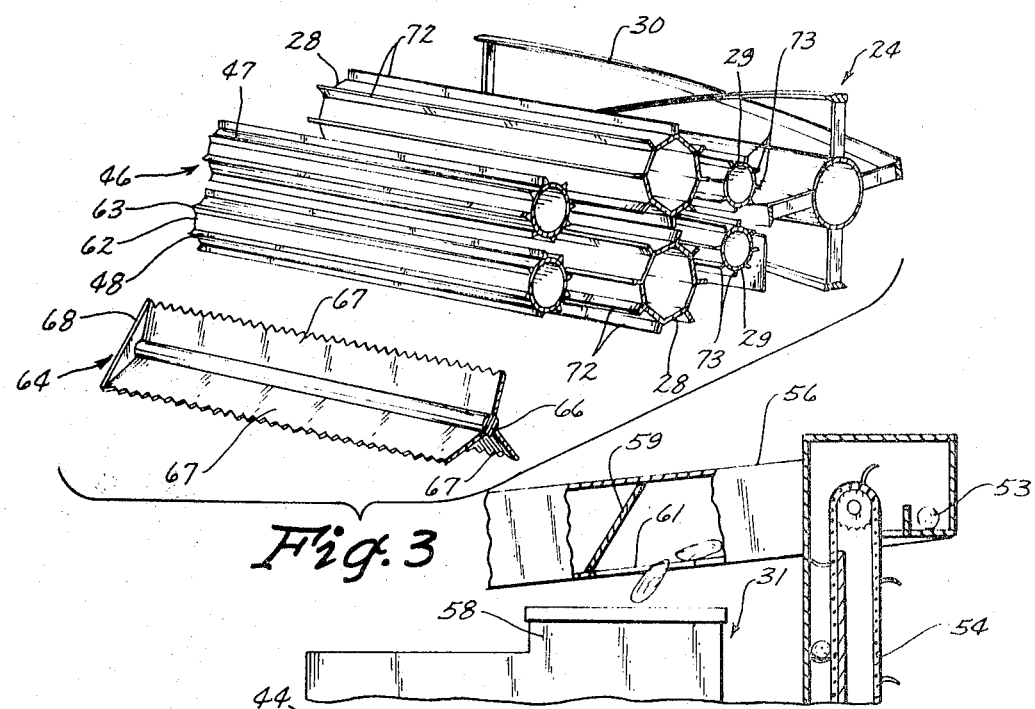
FIG. 3 is an exploded perspective view showing the operative relation of the snapping unit and chopping unit of the machine.

As shown in FIGS. 2 and 3, each snapping roll 47 and 48 is comprised of a tubular cylinder 62 having a series of circumferentially spaced axially extended flutes 63, illustrated as eight in number. A cylinder 62 is formed of a pipe material and the flutes 63 are constructed from an angle iron material.

Located forwardly and downwardly of the lower snapping roll 48 (FIG. 2) is a transverse rotatable feeder paddle 64, the axis of which is parallel to but positioned below the level of the axis of the lower snapping roll 48. The feeder paddle 64 (FIGS. 2 and 3) has a shaft 66 provided with three axially extended radially projected flat bars 67 spaced equidistantly from each other and interconnected at their opposite ends by brace plates 68. The outer side of each bar 67 is of a serrated construction. The feeder paddle 64 functions to convey the stalks 49 of the cut corn plant 69 butt first into the snapping rolls 47 and 48 and to direct or transfer the snapped ears 53 into the horizontal transverse section 51 of the conveyor 52.

The large pair of feed rolls 28 are of a tubular octagonal shape in transverse cross section (FIGS. 2 and 3). Projected radially from each apex portion of the peripheral surface of a feed roll 28 is an axially extended gripping bar 72. During rotation of the feed rolls 28 a gripping bar 72 on one roll moves between a pair of adjacent bars on the other roll 28.

Each of the small feed rolls 29 is of a pipe construction and carries a plurality of circumferentially spaced axially extended gripping fingers 73 shown as six in number. As clearly appears in FIG. 2, a corn stalk 49 extended transversely of and between the snapping rolls 47 and 48 and the feeder rolls 28 and 29 lies in a substantially horizontal plane with the stationary knife 35 of the sheller 31 having its cutting edge 74 generally in such plane. Thus, when the stalk is fed from the feed rolls 29 it is progressively chopped between the rotary knives 30 and stationary 35 along planes extended transversely thereof into pieces of uniform length for ensilage purposes.

To assure uniformity in the length of the chopped stalks 49 the diameters and speeds of the snapping rolls 47 and 48 and feeder rolls 28 and 29 are relatively predetermined to provide for their operation at about the same peripheral speeds. If the snapping rolls are permitted to overrun the feed rolls 28 and 29, namely, the snapping rolls are operated at a peripheral speed greater than the peripheral speed of the feed rolls 28 and 29, the stalks 49 would buckle and enter the chopping unit 24 diagonally of the knives 35 instead of normal thereto. This diagonal entry of the stalks results in long or diagonal cuttings of the stalks in planes inclined to planes extended transversely of the stalks rather than in such transverse planes. The diagonal cuttings thus appreciably reduce the chopper performance by decreasing its cutting capacity con-currently with increasing its power input requirements.

The power transmission system for driving the various operating units of the harvester machine 20 is diagrammatically shown in FIG. 8. A main drive shaft 76 extended longitudinally of and rotatably mounted on the machine hitch tongue 77 is suitably connected to the power take-off unit 78 of a usual farm tractor 79 (FIG. 1). The drive shaft 76 (FIG. 8) functions as an input shaft for a gear box 81 that has an output shaft 82 extended transversely of and located in the rear section 23 of the machine 20. The output shaft 82 is directly connected to and in axial alignment with the shaft 83 for the rotatable cutting knives 30 of the chopper unit 24.

The end of the shaft 83 for the chopper 24 remote from the gear box 81 has a first sprocket gear 86 connected by a common chain 87 to sprocket gears 88 and 89 for the blower 27 and auger conveyor 26, all respectively. A second sprocket gear 91 adjacent the sprocket gear 86 is chain connected to a sprocket 92 carried on a jack shaft 93 which also carries sprockets 94 and 96 that are chain connected, respectively, to sprockets 97 and 98 for the wagon elevator 33 and shelling cylinder 41 of the corn sheller 31. The jack shaft 93 also carries a sprocket 99 that is chain connected to a sprocket 101 for the auger 43 of the corn sheller 31.

Figure 4:
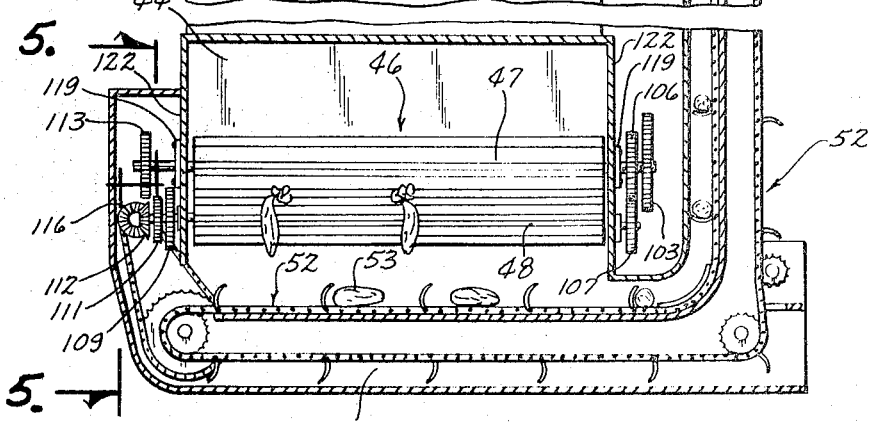
FIG. 4 is a reduced transverse sectional view taken substantially along line 4—4 in FIG. 2 showing the corn ears being conveyed from the snapping unit to a corn shelling unit.

A drive sprocket 102 mounted on the output shaft 82 is chain connected to a sprocket 103 carried on the shaft 104 of the upper snapping roll 47. A gear 106 at one end of the shaft 104 is movable into and out of a meshed engagement with a corresponding gear 107 on the shaft 108 of the lower snapping roll 48. The opposite end of the shaft for the lower snapping roll 48 carries a gear 109, a sprocket gear 111 and a bevel gear 112 (FIGS. 4 and 6). A gear 113 on the shaft 104 of the upper snapping roll 47 is adjustably movable axially thereof into and out of meshed engagement with the gear 109. For a purpose to appear later only one set or pair of the gears 106 and 107, and 109 and 113 is in meshed engagement at any one time.

The sprocket gear 111 on the lower snapping roll shaft 108 (FIG. 8) is chain connected with a sprocket gear 114 for the feeder paddle 64. The bevelled gear 112 (FIGS. 6, 7, and 8) is operatively associated with a bevelled gear 116 on a jack shaft 117 for driving the ear corn conveyor 52 through a gear and chain system indicated generally as 118.

As used in the specification and claims the terms "whole plant corn ensilage" is the sum of all of the corn plant parts less the roots; "corn stover" is the sum of the corn plant parts less the roots, cobs and kernels; and "corn refuse" is the corn stover plus the cobs.

Figure 5:
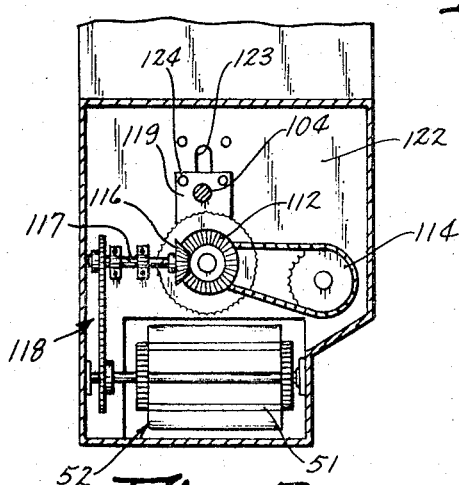
FIG. 5 is a sectional view taken on line 5—5 in FIG. 4.

In the operation of the machine 20, let it be assumed that whole plant corn ensilage is to be harvested. For this purpose and referring to FIG. 9, the upper snapping roll 47 is initially adjusted vertically upward out of an ear snapping relation with the lower snapping roll 48 so that a whole corn plant 69 has unobstructed travel through the snapping unit 46. As shown in FIGS. 5 and 6, the shaft 104 for the upper snapping roll 47 is rotatably supported in end bearing units 119 that are adjustable vertically of the side wall portions 122 of the machine intermediate section 44. The ends of the shaft 104 are movable in corresponding slots 123 formed in the side wall portions 122 and the bearing units 119 are held in an adjusted position by securing screws 124 threadable in the side walls 122.

With the snapping roll 47 adjusted out of a snapping relation with the roll 48 as shown in FIGS. 6 and 9, the gear 106 for the roll 47 is out of meshed engagement with the gear 107 for the lower snapping roll 48. This disengagement of the gears 106 and 107 interrupts the transmission of power from the output shaft 82 (FIG. 8) to the lower snapping roll 48, the conveyor 52, and feeder 64. To maintain this power transmission the gear 113 on the upper snapping roll 47 is axially moved from its inoperative position shown in FIG. 4 to the operative position thereof shown in FIG. 6 in meshed driving engagement with the gear 109 on the lower snapping roll 48.

With the snapping rolls 47 and 48 thus rendered ineffective to remove ears 53 from the whole corn plants 69, such plants (FIG. 9) are freely movable through the snapping unit 46 for travel into and through the feed rolls 28 and 29 directly into the chopper unit 24. The ensilage material from the chopper 24, comprised of the whole corn plant 69 is delivered to the auger 26 and conveyed into the blower 27 for dischrage through the chute 126 into a trailing collecting wagon 127.

Figure 10:
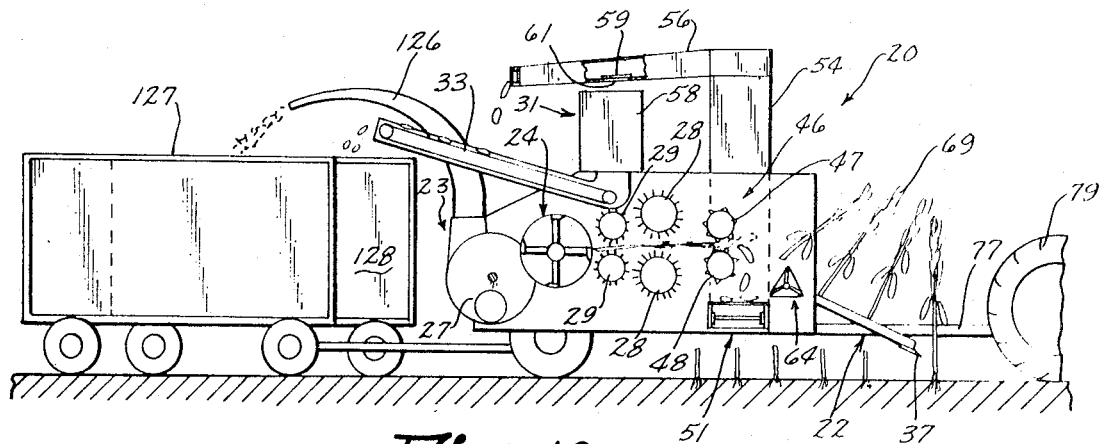
FIG. 10 is illustrated similarly to FIG. 9 and shows the operation of the machine to provide for the harvesting of ear corn and an ensilage comprised of stalks and leaves.

When the corn ears 53 are to be harvested and the residual stover only is to be chopped into ensilage, the upper snapping roll 47 is moved to its adjusted position in an ear snapping association with the lower snapping roll 48 as shown in FIGS. 4 and 10, wherein the gears 106 and 107 are in a meshed engagement and the upper roll gear 113 is axially moved out of a meshed engagement with the lower roll gear 109. Also, the butterfly valve 59 (FIG. 10) in the discharge chute 56 of the conveyor 52 is in a closing position relative to the chute opening 61.

On operation of the machine 20, the whole corn plants 69 are moved into the snapping unit 46 (FIG. 10). The snapped ears 53 are directed onto the transverse horizontal section 51 of the conveyor 52 and carried upwardly by the vertical conveyor section 54 for discharge through the chute 56 and into the wagon elevator 33 for delivery into the trailing corn wagon 128. The residual stover of stalks and leaves travels from the snapping unit 46 between the feed rolls 28 and 29 into the chopper unit 24. The stover ensilage is delivered into the auger 26 and the blower unit 27 for discharge through the chute 126 and into the trailing ensilage wagon 127.

Figure 11:
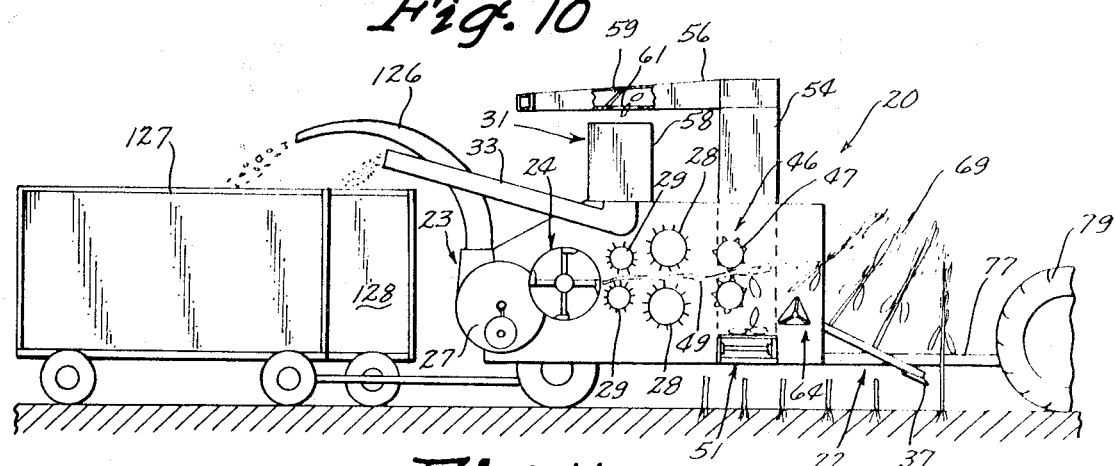
FIG. 11 is illustrated similarly to FIG. 9 and shows the operation of the machine to provide for the harvesting of shelled corn and an ensilage comprised of stalks, leaves and cobs.

To provide for a harvesting of shelled corn and an ensilage comprised of the residual corn refuse the snapping rolls 47 and 48 of the snapping unit 46 are retained in their ear snapping relation shown in FIGS. 4 and 11. However, the butterfly valve 59 is adjusted to its upright position (FIG. 11) to open the chute 56 at the chute opening 61. The snapped ears 53 from the conveyor 52 are then discharged through the opening 61 into the corn sheller 31 with the shelled corn from the sheller outlet 32 being directed into the wagon elevator 33 for discharge into the corn collecting wagon 128.

The cobs resulting from the shelling operation are discharged from the corn sheller 31 through the outlet 32 (FIG. 12) into the chopper unit 24, where they are chopped together with the stover supplied to the chopper unit by the feed rolls 28 and 29. The resulting ensilage of corn refuse is delivered to the auger 26 and discharged by the blower 27 into the chute 126 for delivery into the trailing ensilage wagon 127.

Thus, by merely relatively adjusting the snapping roll gears 106 and 107, and 109 and 113, and the butterfly valve 59, the machine 20 is capable of selectively harvesting a whole corn plant as ensilage; harvesting the corn ears separately from but concurrently with an ensilage comprised of the residual stover; or harvesting the shelled corn concurrently with an ensilage comprised of the corn refuse of stover and cobs.

I claim:

1. A total harvester machine for a corn plant, including:
   (a) a forwardly located row crop unit,
   (b) a rearwardly located chopped material conveyor and discharge system,
   (c) a material chopper unit positioned forwardly of said conveyor and discharge system,
   (d) a snapping unit arranged between said row crop unit and material chopper unit including transversely extended upper and lower snapping rolls,
   (e) means adjustably supporting said upper roll for up and down movement relative to the lower roll to a first ear snapping position and to a second position wherein said snapping rolls are without any snapping action on a corn plant moving therebetween,
   (f) conveying means for receiving snapped ears from said snapping unit having a discharge portion to a wagon elevator,
   (g) means for directing and moving cut corn plants from said row crop unit for travel butt first between said snapping rolls,
   (h) a corn plant, when said snapping rolls are in the first position therefor, having the ears picked therefrom by said snapping unit for discharge to the wagon elevator by said conveying means, and the residual stover chopped by said chopping unit and delivered to said conveyor and discharge system, and when the snaping rolls are in said second position therefor, said corn plant being moved through said snapping unit and into said chopper unit for delivery to said conveyor and discharge system.

2. The total harvester machine according to claim 1, including:
   (a) a corn shelling means,
   (b) means for adjusting the discharge portion of said ear conveying means to direct the picked ears to said wagon elevator or to said shelling means,
   (c) a shelled corn outlet on said shelling means open to the wagon elevator,
   (d) a cob outlet on said shelling means for directing cobs to said chopper unit,
   (e) said corn plant, when the snapping rolls are in said first position therefor, having the ears picked therefrom and carried by said conveying means to said shelling means to provide for a harvesting of shelled corn and chopped material comprised of cobs and stover.

3. A total harvester machine for corn plants comprising:
   (a) a forward section including a row crop unit,
   (b) a rear section including a corn shelling means, a material chopper unit, and means for conveying chopped material for discharge from the machine,
   (c) an intermediate section including an ear snapping unit, means for directing cut corn plants from the row crop unit butt first into said snapping unit, means for feeding corn stalks from the snapping unit into said chopper unit, and means for conveying ears from the snapping unit to said shelling means or to a wagon elevator,
   (d) said shelling means having a shelled corn outlet open to the wagon elevator and a cob outlet for directing cobs into said chopping unit, and
   (e) said snapping unit having an upper snapping roll and a lower snapping roll and means for adjustably moving one of said rolls into and out of an ear snapping relation with the other roll,
   (f) with the corn plants cut by said row crop unit, when the snapping rolls are in an ear snapping relation, having either:
      (1) the snapped ears carried by said conveying means to the wagon elevator and the residual stover chopped by said chopping unit and discharged from the machine, or
      (2) the snapped ears carried by said conveying means to the shelling means with the shelled corn discharged to said wagon elevator and the cobs discharged into the chopper unit to be chopped with the residual stover material for discharge from the machine, and (3) said corn plants cut by the row crop unit, when the snapping rolls are out of an ear snapping relation, being directed between said snapping rolls and into the chopper unit for discharge of the whole chopped plant from the machine.

4. The total harvester machine of claim 3, wherein said intermediate section includes:

(a) a rotatable paddle means located forwardly and downwardly of said snapping rolls for rotation about an axis parallel to the axes of said snapping rolls for directing the corn plants from the row crop unit butt first between said snapping rolls, and (b) feed rolls engageable with a pair of opposite sides of a corn stalk ejected from between said snapping rolls for feeding said corn stalks into said chopping unit, (c) said feed rolls and said snapping rolls having the diameters and rotational speeds thereof relatively pre-determined so that the peripheral speeds of said snapping rolls are substantially equal to the peripheral speeds of the feed rolls to provide for a uniform linear movement of the corn stalks into said chopping unit.

References Cited
UNITED STATES PATENTS

| | | | |
|---|---|---|---|
| 2,100,137 | 11/1937 | Groves | 130—5 C |
| 2,370,560 | 2/1945 | Maus | 56—1 C |
| 2,307,804 | 1/1943 | Ryan | 56—104 |
| 2,826,031 | 3/1958 | Hansen | 56—14.2 X |
| 2,427,861 | 9/1947 | Johnson | 56—104 X |
| 2,542,646 | 2/1951 | Fergason | 56—14.2 X |

LOUIS G. MANCENE, Primary Examiner

D. L. WEINHOLD, Assistant Examiner

U.S. Cl. X.R.

56—16.5, 13.9, 60, 78